(12) United States Patent
Voillat (10) Patent No.: US 6,337,554 B1
(45) Date of Patent: Jan. 8, 2002

(54) DEVICE FOR CONTROLLING AN ELECTRIC MOTOR

(75) Inventor: Jean-Pierre Voillat, Montavon (CH)

(73) Assignee: Bien-Air S.A., Bienne (CH)

( * ) Notice: Subject to any disclaimer, the term of this patent is extended or adjusted under 35 U.S.C. 154(b) by 0 days.

(21) Appl. No.: 09/508,755

(22) PCT Filed: Jul. 7, 1999

(86) PCT No.: PCT/EP99/04781

§ 371 Date: Mar. 16, 2000

§ 102(e) Date: Mar. 16, 2000

(87) PCT Pub. No.: WO00/04631

PCT Pub. Date: Jan. 27, 2000

(30) Foreign Application Priority Data

Jul. 17, 1998 (FR) .............................................. 98 09153

(51) Int. Cl.⁷ ................................ H02P 5/28; H02P 7/36
(52) U.S. Cl. ........................ 318/806; 318/721; 318/722; 318/723; 318/724; 318/254; 318/138; 318/439
(58) Field of Search ................................ 318/806, 705, 318/712, 713, 715, 721–724, 798, 799, 717, 254, 138, 439; 388/907.5, 908, 910, 928.1

(56) References Cited

U.S. PATENT DOCUMENTS

| | | | | |
|---|---|---|---|---|
| 4,978,895 A | * | 12/1990 | Schwarz | 318/254 |
| 5,291,115 A | * | 3/1994 | Ehsani | 318/701 |
| 5,569,990 A | * | 10/1996 | Dunfield | 318/254 |
| 5,640,073 A | * | 6/1997 | Ikeda et al. | 318/439 |
| 5,701,065 A | * | 12/1997 | Ishizaki | 318/701 |
| 5,739,651 A | * | 4/1998 | Miyazawa et al. | 318/439 |
| 5,796,231 A | * | 8/1998 | Kyodo | 318/608 |
| 5,872,442 A | * | 2/1999 | Gotou | 318/727 |

FOREIGN PATENT DOCUMENTS

| | | | | |
|---|---|---|---|---|
| EP | 0 688 539 | 12/1995 | | |
| JP | 01126190 A | * | 5/1989 | 318/254 |
| WO | 92 19 038 | 10/1992 | | |

OTHER PUBLICATIONS

Patent Abstract of Japan, vol. 097, No. 009, Sep. 30, 1997 & JP 09 121585 A (Mabuchi Motor Co., LTD.), May 6, 1997.

Iqbal Husain et al "Rotor Position Sensing in Switched Reluctance Motor Drives by Measuring Mutually Induced Voltages" IEEE Transactions on Industry Applications, vol. 30, No. 3, May 1, 1994 pp. 665–671.

* cited by examiner

Primary Examiner—Robert E. Nappi
Assistant Examiner—Edgardo San Martin
(74) Attorney, Agent, or Firm—Sughrue Mion, PLLC (57) ABSTRACT

The present invention concerns a device (20) for controlling an electric motor (1) including a rotor (6) and at least three stator coils (2, 3, 4) connected between three connection terminals, means (5) for providing three control signals (Ua, Ub, Uc) to said connection terminals, and means (22) for dectecting said rotor angular postion. Said dectecting means include measuring means (24) designed to be connected to the motor, such that the means form with said coils at least two oscillating circuits supplying two respective signals (U1, U2) at two measurement frequencies respectively which are themselves periodic functions of said rotor angular position, and means (26) for calculating a single value corresponding to the two measurement frequencies, this value being the desired angular position.

28 Claims, 8 Drawing Sheets

CONFIGURATION Y1

DEVICE FOR CONTROLLING AN ELECTRIC MOTOR

BACKGROUND OF THE INVENTION

The present invention concerns the field of electric motors including at least three stator coils and, more particularly, a device for controlling such a motor including detecting means for detecting the instantaneous angular position of a rotor.

A <<brushless motor>> or a motor with no commutator>> is defined in the present description as a direct current electric motor which includes a mobile part (or <<rotor>>) provided with a permanent magnet, and a fixed part (or <<stator>>) provided with at least three fixed bipolar coils. In the event that the motor includes three stator coils, they are arranged so as to be staggered at 120° to each other. A motor of this type has the advantage of being able to be sterilized, for example in an autoclave, unlike motors with brushes, whose brushes decompose during sterilization. The question of sterilization thus becomes a primary concern, in particular in application fields requiring optimum sanitary hygiene, such as the field of medical instruments.

Figure 1:
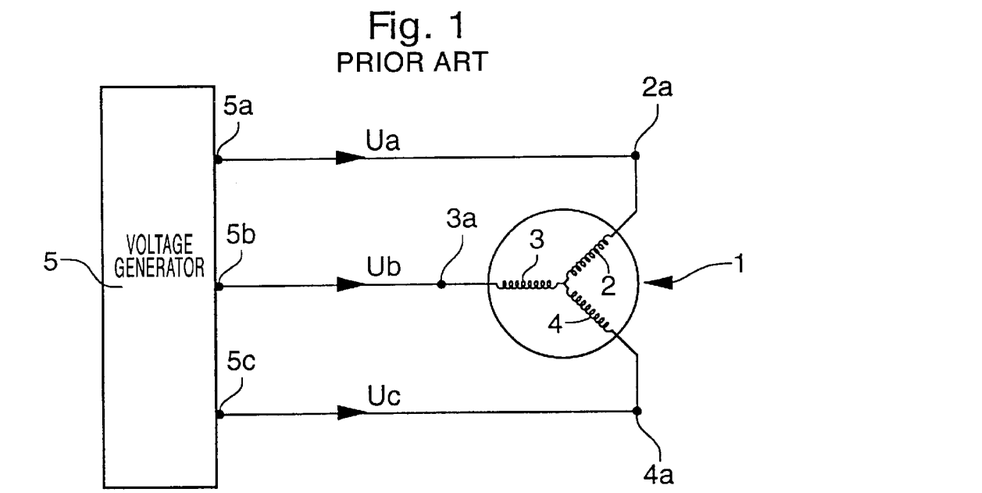
FIG. 1, which has already been cited, shows schematically a conventional brushless motor controlled by a conventional voltage generator.

FIG. 1 shows schematically a brushless motor 1 provided with three stator coils 2 to 4, the motor being controlled by a conventional voltage generator 5. For this purpose, each of coils 2 to 4 includes a connection terminal. References 2a, 3a and 4a respectively designate the connection terminals of coils 2, 3 and 4. Generator 5, includes three connection terminals 5a, 5b and 5c connected respectively to terminals 2a, 3a and 4a, and it is arranged to be able to provide, via terminals 5a to 5c, three respective electric voltages Ua to Uc to the three respective coils 2 to 4, which achieves the control of motor 1.

Figure 2:
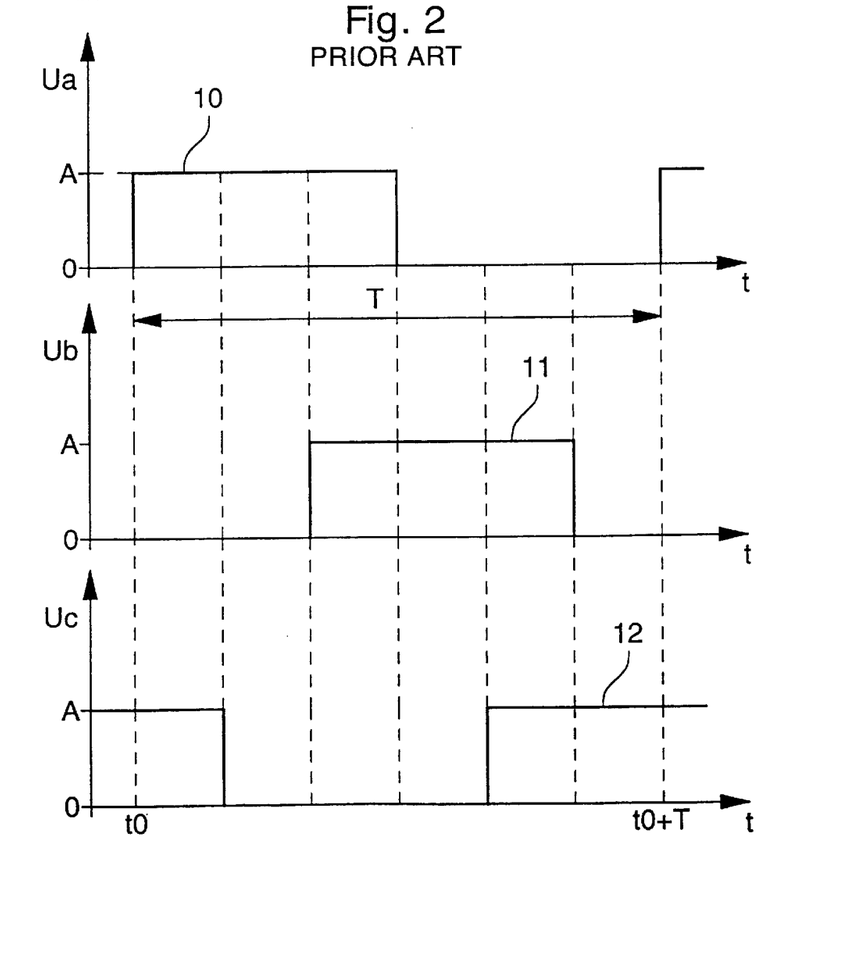
FIG. 2, which has already been cited shows three timing diagrams of control voltages of the motor of FIG. 1.

FIG. 2 shows three timing diagrams 10 to 12 of voltages Ua to Uc when the motor of FIG. 1 is being controlled. It will be noted that the set of these three voltages constitutes a three phase system formed of square periodic signals, these signals having the same amplitude designated A and the same period designated T, and being phase shifted by T/3 with respect to each other. In FIG. 2, the reference t0 designates any initial instant.

When voltages Ua to Uc of FIG. 2 are applied to the respective coils 2 to 4 of FIG. 1, the coils can be polarized sequentially in accordance with six different states. The first state corresponds to the interval of time comprised between instant t0 and t0+T/6, during which voltages Ua, Ub and Uc respectively have the value A, 0 and A. The second state corresponds to the interval of time comprised between instants t0+T/6 and t0+2T/6, and so on. As a result of this polarization, a rotating field able to cause the rotor to rotate is generated, the permanent magnet of the rotor being arranged in close proximity to coils 2 to 4. By way of example, the rotational speed of the rotor can vary between 0 and 40,000 tr/min, and the frequency F0 corresponding to period T can be comprised between 1 and 667 Hz.

One problem encountered with a control of this type is that it is necessary to detect the instantaneous angular position of the rotor. In order to cause the rotor to rotate to a desired angular position, the rotor angular position must be detected at the instant when control voltages are applied to the stator coils, so that the values of the voltages applied can create, in the air gap, a magnetic field able to cause the rotor to rotate from the angular position thus detected to the desired angular position.

A first conventional solution to the problem of detecting the rotor angular position consists in fitting such a motor with a coding device which is linked to the rotor, and which controls the switching of the electric voltages applied to the stator coils. For example, contactless electronic sensors are commonly used to detect the rotor angular position, said coding device including a magnet which rotates with the rotor, and several cells or Hall effect sensors situated in the field of the magnet, and fixed to the stator so as to switch when there are magnetic field reversals. It will be recalled that a Hall effect cell is arranged to be able to detect the variations in a neighbouring magnetic field.

A solution of this type has various drawbacks. In particular, Hall effect cells are relatively expensive and the mounting thereof in proximity to the motor increases the space requirement of the latter. Furthermore, it is necessary to use, in addition to the three power supply wires of the motor, two wires for supplying power to the Hall effect cells and three wires for collecting the data provided by thereby. It goes without saying that the arrangement of an instrument with eight wires goes against constraints as to handling ability, sterilization, weight, robustness and cost, these constraints being common in industry, in particular within the field of medical instruments.

A second conventional solution to the problem of detecting the rotor angular position consists in measuring the back-electromotive force which is proportional to the rotational speed of the rotor and which, consequently, can provide data relating to its movement and thus to the speed of the rotor.

One drawback of such a solution lies in the fact that it does not allow the rotor angular position to be detected directly.

Another drawback of this solution lies in the fact that this force decreases with the rotational speed of the rotor, which makes it difficult to measure.

Another drawback of this solution lies in the fact that detection of the instantaneous position of the rotor disturbs the normal operation of the motor. The back-electromotive force measurement can not be performed simultaneously with the supply of the motor control voltages. Thus, the working of the motor is interrupted at each back-electromotive force measurement.

It has thus been observed that all the solutions proposed in the state of the art to answer the aforementioned problem were not satisfactory for, on the one hand, detecting the instantaneous angular position of the rotor and, on the other hand, answering constraints or concerns belonging to specific application fields, for example for controlling a brushless motor in a dental instrument. Also by way of example, within the scope of an application to robotics, the conventional solutions do not allow the rotation of the rotor from a predetermined angle to be controlled with sufficient precision and with a small number of lead wires.

SUMMARY OF THE INVENTION

One object of the present invention is to provide a control device able to be connected to a brushless motor, this device overcoming the aforementioned drawbacks and, in particular, being able to detect the instantaneous angular position of the motor rotor.

Another object of the present invention is to provide a control device able to be connected with a minimum of connecting wires, so as to answer the constraints as to handling ability, weight and cost, such constraints being common in industry, and in particular in the field of medical instruments.

Another object of the present invention is to provide a control device able to detect the instantaneous angular position of the rotor independently of the rotational speed of the rotor, even if the rotor has stopped.

Another object of the present invention is to provide a control device able to detect the instantaneous angular position of the rotor without disturbing the normal operation of the motor.

Another object of the present invention is to provide a control device answering the constraints as to sterilization and robustness, in particular for an application in the field of medical instruments.

These objects, in addition to others, are achieved by the control device according to claim 1.

The device according to the invention includes detecting means which have the advantage of providing at least two measurement signals at respective frequencies which together represent the rotor angular position, and that the supply of these signals is independent of the normal operation of the motor, in particular the control of the latter by the power supply means.

Another advantage of these detecting means lies in the fact that they are connected to the power supply wires connecting the motor to the power supply means, without requiring additional connections between the motor and the detecting means to be able to detect the rotor angular position. As a result, the motor fitted with such an acquisition device answers the concerns as to handling ability, robustness and weight, which are common in industry, in particular in the field of dental instruments.

The device according to the present invention further includes filtering means which have the advantage of filtering the measurement signals across the output terminals of the power supply means, so as to assure that the supply of these signals does not disturb the control of the motor by the power supply means.

The device according to the present invention further includes measurement means which have the advantage of providing the measurement signals whose frequencies are higher than the frequency of the control signals, and whose amplitudes are lower than said control signals, so that the measurement signals do not interfere with the control signals when the motor is controlled, so as to assure that the supply of the control signals does not disturb the control of the motor via the power supply means.

Another advantage of the detecting means lies in the fact that they include inexpensive, non complex and compact electronic components, which answers the usual industrial concerns as to price, rationalization and compactness.

Another advantage of the control device according to the present invention lies in the fact that they allow, in particular when the rotor has stopped, the instantaneous angular position of the rotor to be detected, without inducing any effect on the inductive distribution of the rotating field present in the motor air gap. Those skilled in the art will note that the measurement signals at their respective frequencies can be provided for any value of the rotational speed of the rotor, and in particular when the rotor has stopped, since the detection of the angular position is derived from the measurement of the measurement frequencies which are provided independently of the control of the motor by the power supply means.

Another advantage of the control device according to the present invention lies in the fact that it allows the instantaneous angular position of the rotor to be detected with a precision of the order of a degree, which answers a demand for precision, which is common in industry, in particular in the field of robotics and dental implantology.

The device according to the present invention further includes processing means which have the advantage of comparing the calculated angular position with a comparison value, which allows the evolution of the angular position to be monitored over time.

Another advantage of these processing means lies in the fact that they allow the number of revolutions made by the rotor to be calculated, was well as the rotor speed and acceleration, which allows the evolution of these parameters to be monitored over time.

BRIEF DESCRIPTION OF THE DRAWINGS

These objects, features and advantages of the present invention, in addition to others, will appear more clearly upon reading the detailed description of two preferred embodiments of the present invention, given solely by way of example, in relation to the annexed drawings, in which.

Figure 3:
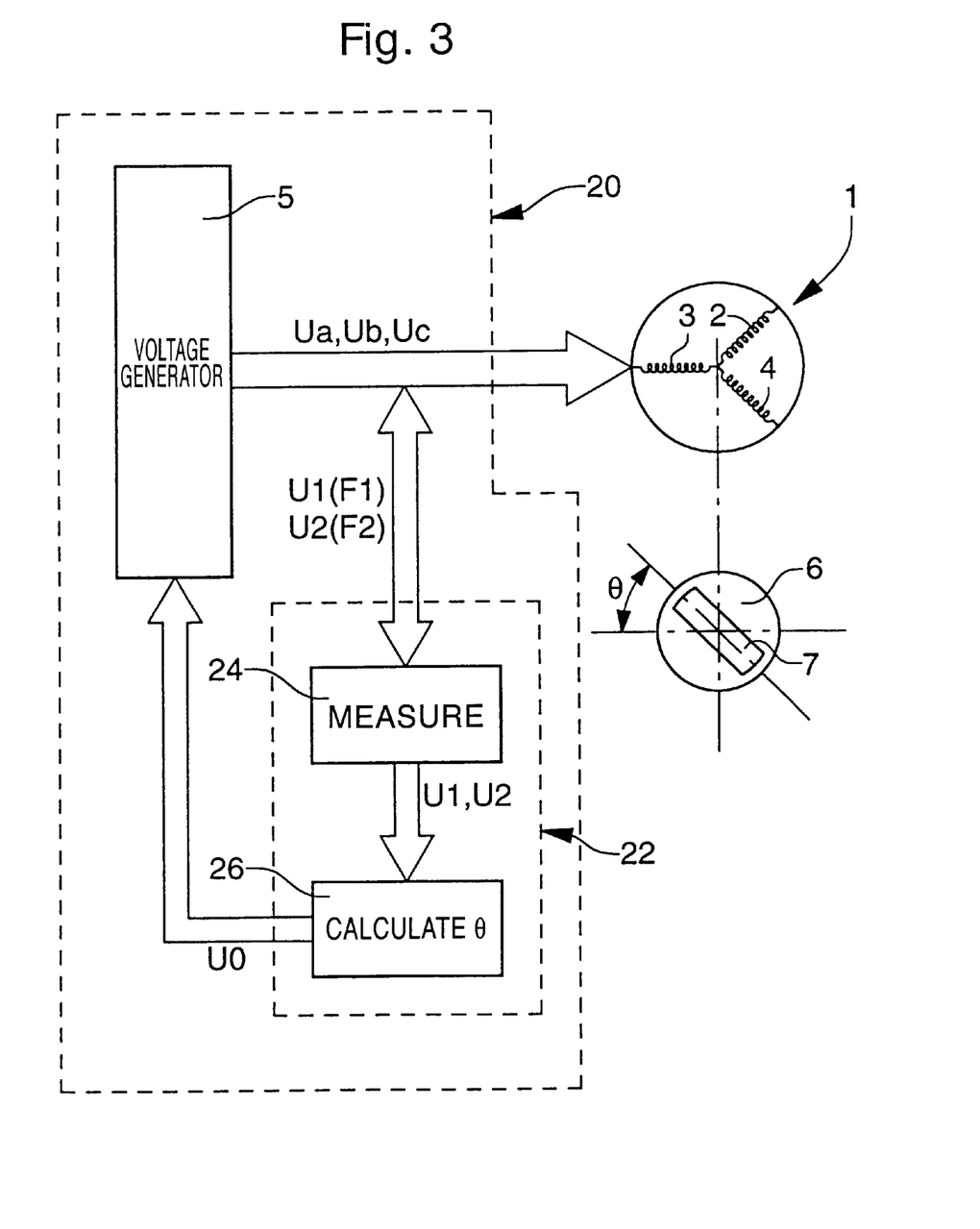
FIG. 3 shows a block diagram of a control device according to the present invention connected to the motor of FIG. 1.

FIG. 3 shows a block diagram of a control device according to the present invention designated by the reference 20. This device is arranged and connected to a motor similar to motor 1 of FIG. 1, so as to control the latter. It will be noted in FIG. 1 that elements of control device 20 which are identical to those described in relation to FIG. 1, have been designated by the same references.

DETAILED DESCRIPTION OF THE DRAWINGS

Figure 5:
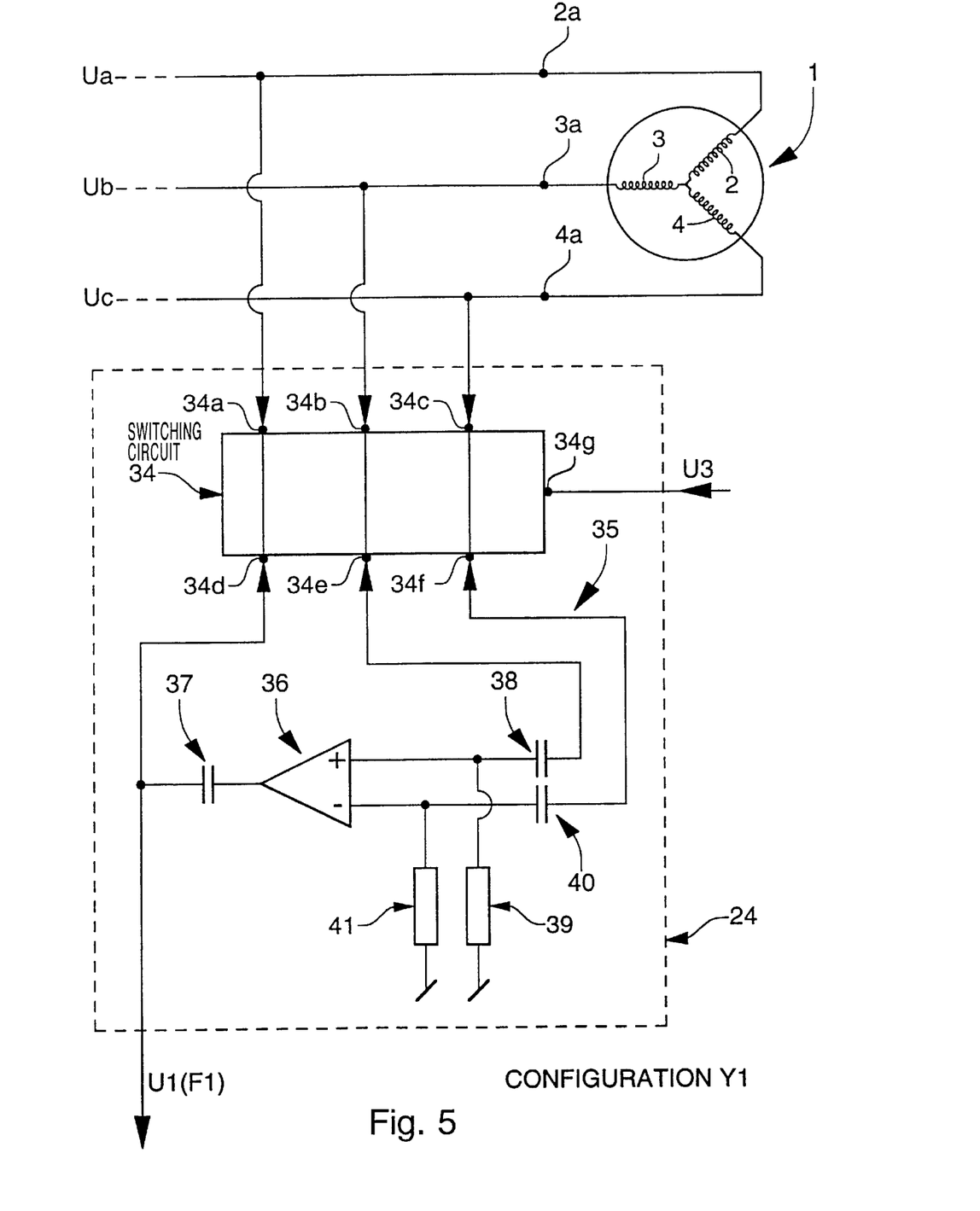
FIGS. 5 and 6 shows two electric configurations of the device of FIG. 4.

FIG. 5 shows a block diagram of a control device according to the present invention designated by the reference 20. This device is arranged and connected to a motor similar to motor 1 of FIG. 1, so as to control the latter. It will be noted in FIG. 1 that elements of control device 20 which are identical to those described in relation to FIG. 1, have been designated by the same references.

Motor 1 is connected to power supply means forming supply means similar to generator 5 of FIG. 1. It will be recalled that voltage generator 5 is arranged to connect coils 2 to 4 successively to a power source which is not shown, so as to provide voltages Ua, Ub and Uc to coils 2 to 4 as is shown in timing diagrams of FIG. 2. The connections of voltage generator 5 are achieved in response to a signal U0 which is compatible with the proper operation of voltage generator 5, the supply of this signal being described hereinafter.

Control device 20 includes means 22 for detecting the angular position θ of the rotor. Detecting means 22 include means 24 for measuring two distinct different frequencies F1 and F2, measuring means 24 supplying two signals U1 and U2 at two respective frequencies F1 and F2. Detecting means 22 further include means 26 for calculating angular position θ from the two signals U1 and U2, and for providing this position in the form of signal U0.

Figure 4:
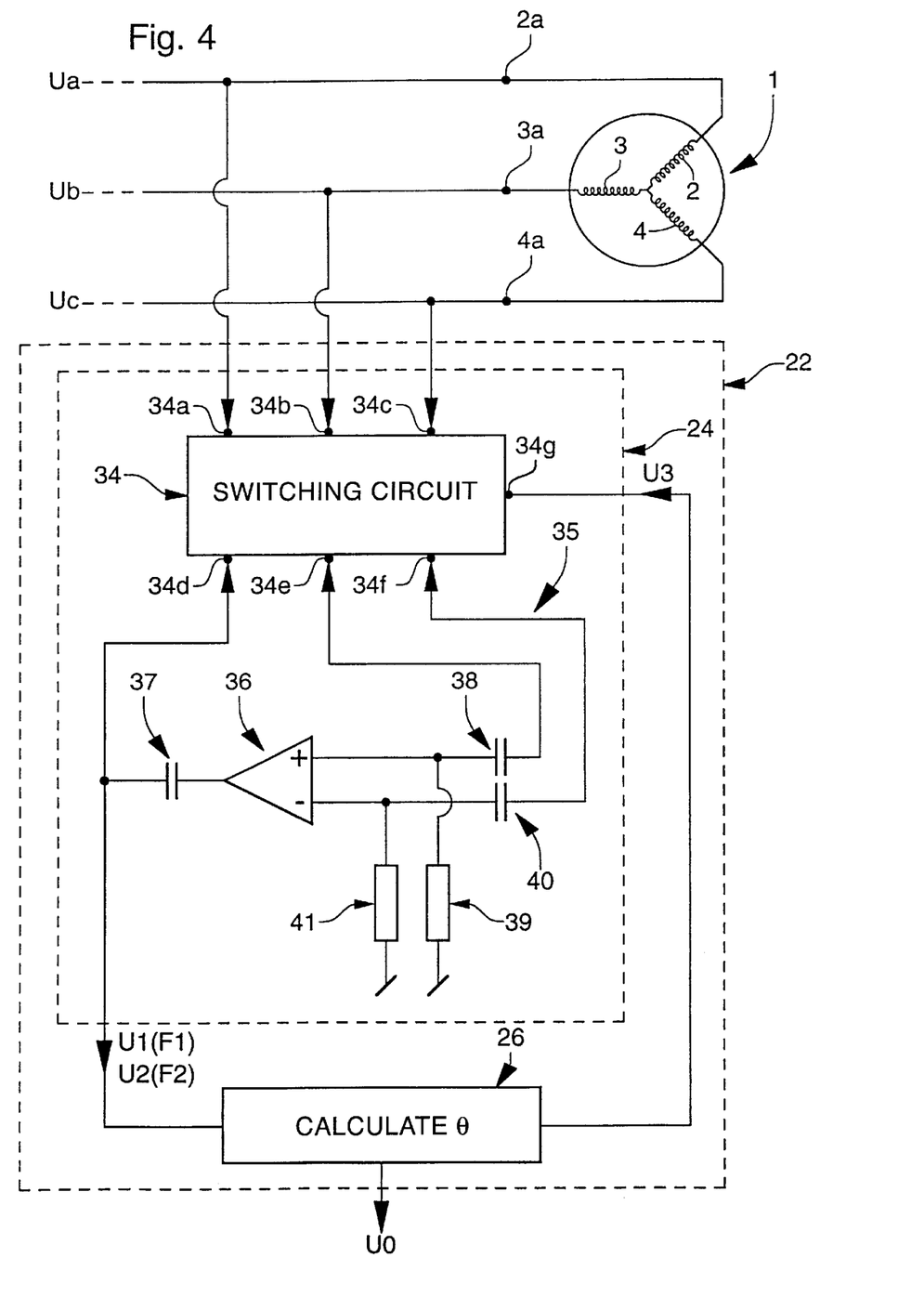
FIG. 4 shows a first embodiment of the device of FIG. 3.

FIG. 4 shows a first embodiment of device 20, in particular of measuring means 24.

Measuring means 24 include a switching circuit 34 including a first group of terminals 34a to 34c, a second group of terminals 34d to 34f and a control terminal 34g. Switching circuit 34 is arranged to be able to receive a control signal U3 via terminal 34g, and in response to connect terminals 34a to 34c on the one hand, to terminals 34d to 34f on the other hand, in accordance with two electric configurations Y1 and Y2 described hereinafter in relation to FIGS. 5 and 6. It will be noted that the supply of signal U3 is described in more detail hereinafter in relation to FIG. 10. Switching circuit 34 is preferably made using switches formed by known electronic components, which perform the connections of configurations Y1 and Y2.

Measuring means 24 further include an amplification circuit 35 intended to provide periodic signals U1 and U2 respectively at frequencies F1 and F2, when switching means 34 are in the respective configurations Y1 and Y2. In the example of FIG. 4, amplification circuit 35 includes an operational amplifier 36 whose output is connected, via a capacitor 37, to terminal 34d. The non-inverting input (or <<+>> terminal) of operational amplifier 36 is connected, on the one hand, to terminal 34e via a capacitor 38, and on the other hand to the device's earth via a resistor 39. The inverting input (or <<−>> terminal) of operational amplifier 36 is connected, on the one hand, to terminal 34f via a capacitor 40, and on the other hand to the device's earth via a resistor 41.

Figure 6:
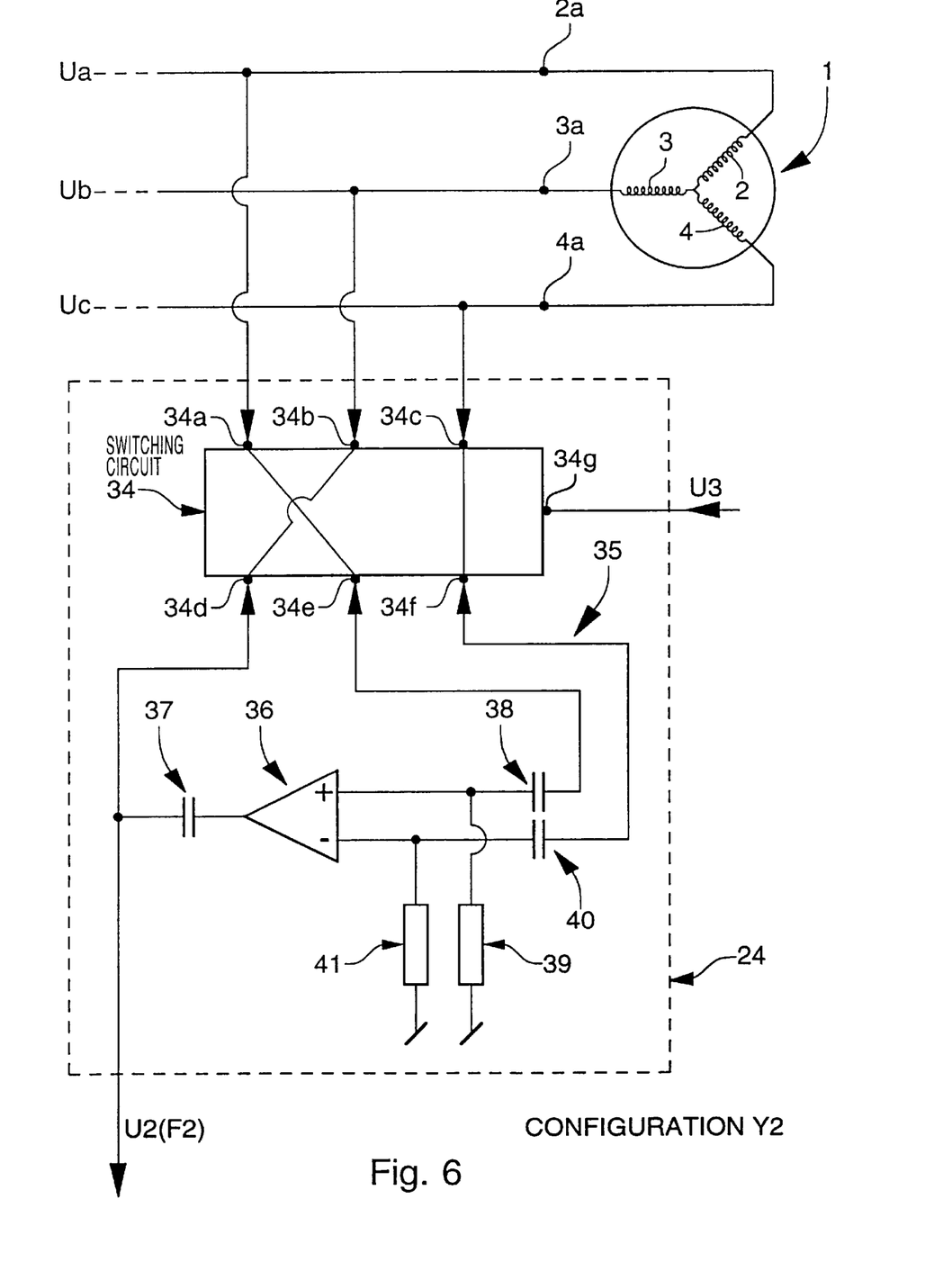

The two configurations Y1 and Y2 of switching circuit 34 will now be described. FIGS. 5 and 6 show the electric diagrams of measuring means 24 of FIG. 4, in accordance with the respective configurations Y1 and Y2. In the following description, the references Y1 and Y2 will also designate the electric diagrams of measuring means 24 connected to motor 1 via switching circuit 34, in accordance with the two respective configurations thereof Y1 and Y2. It will be noted in FIGS. 5 and 6 that the elements of control device 20 which are identical to those described in relation to FIG. 4 have been designated by the same references.

In configuration Y1, as shown in FIG. 5, switching circuit 34 is arranged so that terminals 34a to 34c are respectively connected to terminals 34d to 34f. In other words, in configuration Y1, the output of operational amplifier 36 is connected to terminal 2a of motor 1, via capacitor 37, and the non-inverting and inverting inputs of the amplifier are connected respectively to terminals 3a and 4a. Thus, in configuration Y1, measuring means 24 (i.e. switching circuit 34 and amplification circuit 35) and coils 2 to 4 form a first oscillating circuit in which the output of operational amplifier 36 supplies, via capacitor 37, signal U1 to coil 2 and to calculating means 26.

Those skilled in the art will note that signal U1 is periodic at frequency F1 which depends in particular on the impedance seen from the <<+>> and <<−>> terminals of operational amplifier 36. This impedance depends directly on the inductance of coils 2 to 4. Moreover, it is known that the inductance of a winding or a coil depends not only on its structure, but also on the intensity of the magnetic field which passes through it. Thus, in the case of motor 1, coils 2 to 4 are magnetically coupled to the permanent magnet of the rotor, and part of the magnetic field generated by the magnet, which depends on angular position θ of the magnet with respect to the coil concerned, passes through each of coils 2 to 4. In other words, frequency F1 depends on angular position θ of the rotor.

Figure 7:
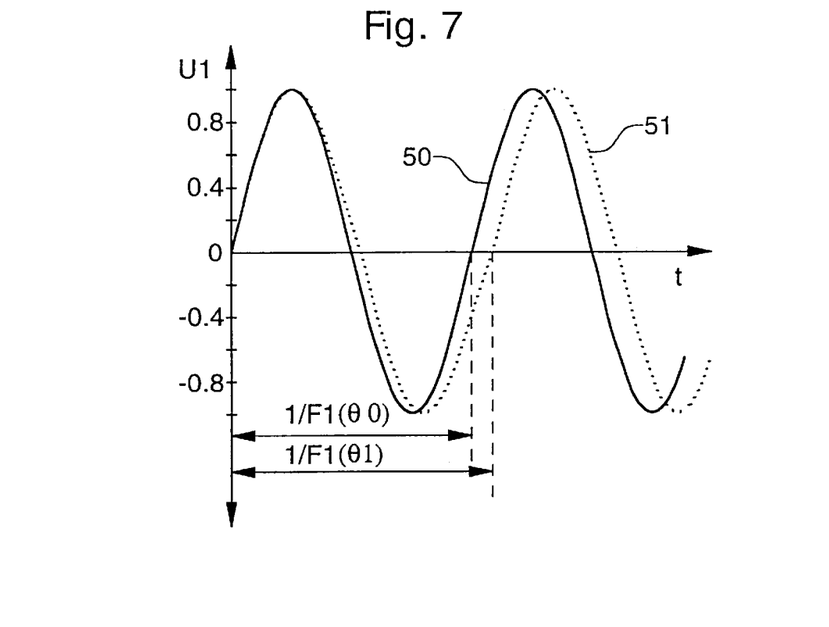
FIG. 7 shows two curves illustrating the temporal evolution of a measurement signal associated with the configuration of FIG. 5, when the rotor is in two respective angular positions.

Purely by way of illustration, FIG. 7 shows two curves 50 and 51 illustrating the temporal evolution of signal U1, when the rotor is respectively in a first angular position θ0 or reference position and in a second angular position θ1 different to the reference position. Curves 50 and 51 of FIG. 7 were measured experimentally, for the purpose of demonstrating the sensitivity of frequency F1 as a function of angular position θ. Thus, frequency F1 (θ0) was measured as equal to 1.43 MHz, and frequency F1 (θ1) as equal to 1.3 MHz, i.e. a frequency difference equal to 130 MHz between angular positions θ0 and θ1.

Those skilled in the art will also note that frequency F1 varies periodically with angular position θ, at a period which corresponds to a rotor rotation of 360° divided by the number of poles of the magnet of the rotor. In the present case, since this number is equal to 2, the period of variation in frequency F1 therefore corresponds to a rotation of 180° of the rotor.

Figure 8:
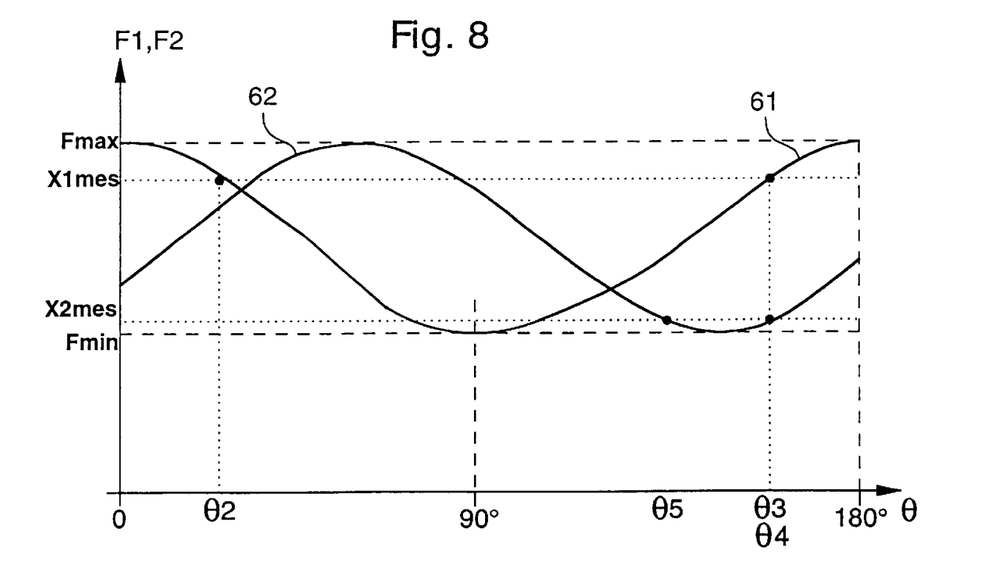
FIG. 8 shows two curves illustrating the relations between the rotor angular position and two measured frequencies associated with the configurations of FIGS. 5 and 6.

Purely by way of illustration, FIG. 8 shows a curve 61 illustrating the variations in frequency F1 as a function of angular position θ. The references Fmin and Fmax designate respectively the minimum and maximum values of frequency F1.

In configuration Y2, as shown in FIG. 6, switching circuit 34 is arranged so that terminals 34a to 34c are connected respectively to terminals 34e, 34d and 34f, which forms said configuration Y2. In other words, the output of operational amplifier 36 is connected to terminal 3a of motor 1, via capacitor 37, and the non-inverting and inverting inputs of the amplifier are connected respectively to terminals 2a and 4a. Thus, in configuration Y2, measuring means 24 (i.e. switching circuit 34 and amplification circuit 35) and coils 2 to 4 form a second oscillating circuit in which the output of operational amplifier 36 provides, via capacitor 37, signal U2 to coil 3 and to calculating means 26.

FIG. 8 also shows a curve 62 illustrating the variations in frequency F2 as a function of angular position θ. As this Figure shows, like frequency F1, frequency F2 varies periodically between a minimum value and a maximum value, with a period which corresponds to a rotation of 180° of the rotor. It goes without saying that the minimum and maximum values of frequency F2 are equal respectively to those of frequency F1, to the extent that coils 2 to 4 are symmetrical, and have the same number of turns and the same inductance. Moreover, it will be noted in FIG. 8 that curve 61 associated with frequency F1 is phase shifted by 120° with respect to curve 62 associated with frequency F2. Those skilled in the art will easily understand that this phase shift derives from the arrangement of coils 2 to 4 in motor 1, and the bipolar magnet, in this example, of the rotor.

Those skilled in the art will note that the supply of signals U1 and U2 at respective frequencies F1 and F2 must not disturb the normal operation of motor 1, i.e. the control of motor 1 by voltage generator 5.

For this purpose, amplification circuit 35 is arranged so that the amplitudes of signals U1 and U2 are substantially lower than those of voltages Ua to Uc, and that the minimum values of frequencies F1 and F2 are substantially higher than the maximum value of frequency F0 of voltages Ua to Uc. Moreover amplification circuit is arranged so that the maximum value of frequencies F1 and F2 are substantially lower than the value of the frequency of the signal used during electromagnetic compatibility tests which are commonly practiced in particular in the field of dental instruments, the minimum frequency used during electromagnetic compatibility tests being of the order of 30 MHz.

By way of example, in the event that the amplitude of voltages Ua to Uc varies from 0 to 24 V, and frequency F0 of the voltages is comprised between 1 and 667 Hz, the amplitude of signals U1 and U2 is approximately 2 V, and frequencies F1 and F2 are of the order of several MHz.

Likewise, in order to avoid disturbing the supply of control voltages Ua to Uc, i.e. in order to assure normal operation of motor 1, three filters (not shown) can be connected respectively to output terminals 5a to 5c of voltage generator 5, to filter the measurement linked signals (in particular signals U1 and U2), whose frequency is of the order to several MHz, while not modifying voltages Ua to Uc. Preferably, said filters are made using three band stop filters each including a coil and a capacitor connected in parallel with the coil, these filters blocking signals U1 and U2 whose respective frequencies F1 and F2 belong to the range of frequencies blocked by said band stop filters. By way of variant, said filters can be made using three low-pass filters including three respective coils series connected between outputs 5a, 5b and 5c respectively, and connection terminals 2a, 3a and 4a, respectively and three respective capacitors connected in parallel between respective output terminals 5a, 5b and 5c and the device's earth.

As regards calculating means 26, it will be recalled that these means are arranged to calculate the angular position from the two signals U1 and U2.

Figure 9:
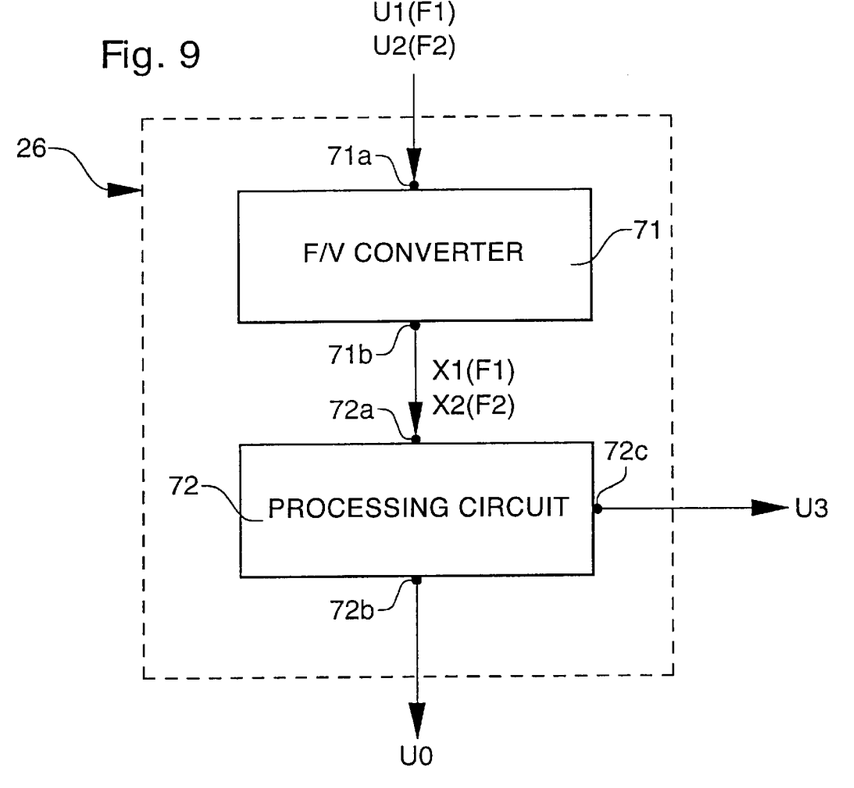
FIG. 9 shows in more detail calculating means associated with the device of FIG. 4.

FIG. 9 shows an embodiment of calculating means 26 of control device 20 of FIG. 4. It will be noted in FIG. 9 that the elements of control device 20 which are identical to those described in relation to the preceding Figures have been designated by the same references.

As FIG. 9 shows, calculating means 26 include a frequency-voltage converter 71 and a processing circuit 72.

Frequency-voltage converter 71 includes an input terminal 71a connected to the output of operational amplifier 36 of FIG. 4, and an output terminal 71b connected to processing circuit 72. Converter 71 is arranged to receive signal U1 (respectively U2) via a terminal 71a, and to convert this signal into a voltage X1 (respectively X2) which is compatible with the operation of processing circuit 72, the amplitude of this voltage being proportional to the difference between frequency F1 (respectively F2) and a known value of such frequency (for example, value Fmax or Fmin of FIG. 8). converter 71 is also arranged to supply voltage X1 (respectively X2) via a terminal 71b. Preferably, frequency-voltage 71 is formed by a known frequency discriminator.

Processing circuit 72 includes an input terminal 72a connected to output terminal 71b of converter 71 and an output terminal 72b connected, in the example of FIG. 3, to voltage generator 5. Furthermore, processing circuit 72 is arranged to receive voltages X1 and X2 via terminal 72a, and to carry out operations enabling the single value of angular position $\theta$ corresponding to the couple {F1, F2} of frequencies F1, F2 represented by voltages X1 and X2 to be determined.

In order to better understand the operations carried out by processing circuit 72, reference will again be made to FIG. 8. Thus, an instantaneous measured voltage X1mes corresponds, by definition, to a value of frequency F1 comprised between Fmax and Fmin, represented in FIG. 8 by the reference X1mes. As this Figure shows, voltage X1mes corresponds on curve 61 to two angular values $\theta 2$ and $\theta 3$ comprised between 0 and 180°. Likewise, an instantaneous measured voltage X2mes corresponds on curve 62 to two angular values $\theta 4$ and $\theta 5$. It will be noted that two values among values $\theta 2$ to $\theta 5$ (in the present case $\theta 3$ and $\theta 4$) are congruent modulo 180°, which defines the existence of a single value comprised between 0 and 180°. In other words, it corresponds to the couple {X1mes, X2mes} a single value which is equal to value $\theta 3$ associated with curve 61, or to value $\theta 4$ associated with curve 62, this single value being desired angular position $\theta$.

In practice, given that curves 61 and 62 of FIG. 8 are identical to each other, at an offset close to 120°, processing circuit 72 is programmed to contain a single correspondence table between voltage X1 or X2 and angular value $\theta$, this table being similar to a conventional trigonometric table between values Arc sin($\theta$) and the corresponding angular values $\theta$. Processing circuit 72 is programmed to carry out the following successive operations. A first operation consists in determining, from said table, a first couple of angular values $\theta 6$ and $\theta 7$ corresponding to voltage X1 received by terminal 72a, as well as a second couple of angular values $\theta 8$ and $\theta 9$ corresponding to voltage X2. And a second operation consists in determining, from among values $\theta 6$ to $\theta 9$, the two values the difference between which is 120° and, amongst these two values, that which corresponds to curve 61, this value being considered the desired angular position $\theta$.

It will be noted that the value of 120° introduced into said second operation corresponds to the offset of 120° of curves 61 and 62 of FIG. 8, this offset having already been mentioned hereinbefore. Thus, in the event that the angular values corresponding to voltages X1mes and X2mes are determined from said table (and not from curves 61 and 62 of FIG. 8), the existence of this offset has to be mathematically introduced by calculating the differences between values $\theta 6$ to $\theta 9$, two of them having a distance of 120° between them.

It will also be noted that the use of the correspondence table can require an additional initial operation which consists in normalizing voltages X1mes and X2mes, from peak values of voltages X1 and X2 which depend on the components of the device.

It goes without saying that the results of the operations carried out by processing circuit 72 do not provide exact values but approximate values. By way of improvement, a third measurement frequency F3 could be provided, for example during a third configuration Y3, which allows the accuracy of angular position $\theta$ obtained during these calculations to be increased.

Preferably, processing circuit 72 is made using a conventional 32 bit microprocessor. This microprocessor is programmed to carry out the aforementioned programs in particular.

As shown in FIG. 4 in conjunction with FIG. 9, processing circuit 72 can also be programmed to provide, via terminal 72c, control signal U3 by switching means 34, so as to define a measurement cycle divided into three phases, so that, during the first and second phases, measuring means 24 respectively have configurations Y1 and Y2 to provide calculating means 26 with respective signals U1 and U2 and, during the third phase, calculating means 26 determines the desired angular position.

Figure 10:
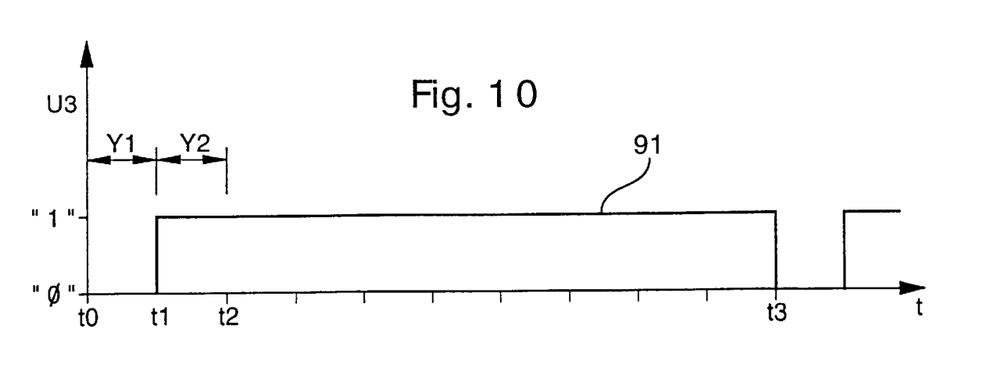
FIG. 10 shows a timing diagram of a signal provided by the calculating means of FIG. 9, to control the configurations of FIGS. 5 and 6.

Purely by way of example, FIG. 10 shows a timing diagram 91 of signal U3. Reference t0 designates an initial instant from which the first phase of a measurement cycle starts, reference t1 designates the instant when this first phases finishes and the second phase of the same cycle starts, reference t2 designates the instant when this second phase finishes and the third phase of the same cycle starts, and reference t3 designates the instant when this third phase finishes and a new measurement cycle starts. Signal U3 has a value <<0>> during the first phase, and <<1>> during the following phases. By way of illustration, it will be noted that the time interval between instants t0 and t1, as well as that between instants t1 and t2, is comprised between 50 and 100 $\mu$s, and that the time interval between instants t2 and t3 is comprised between 400 and 600 $\mu$s.

It goes without saying for those skilled in the art that the above detailed description can undergo various modifications, alternative embodiments and improvements without departing from the scope of the present invention.

By way of variant, the device according to the present invention can be arranged to control a motor including a greater number of stator coils than three. In such case, the connections between the motor and the power supply means, as well as those between the motor and the measuring means, are arranged to be suited to the number of stator coils of the motor.

Also by way of variant, the measuring means of this device can include a switching circuit which is not controlled by the processing circuit, but which is connected to independent control means.

Figure 11:
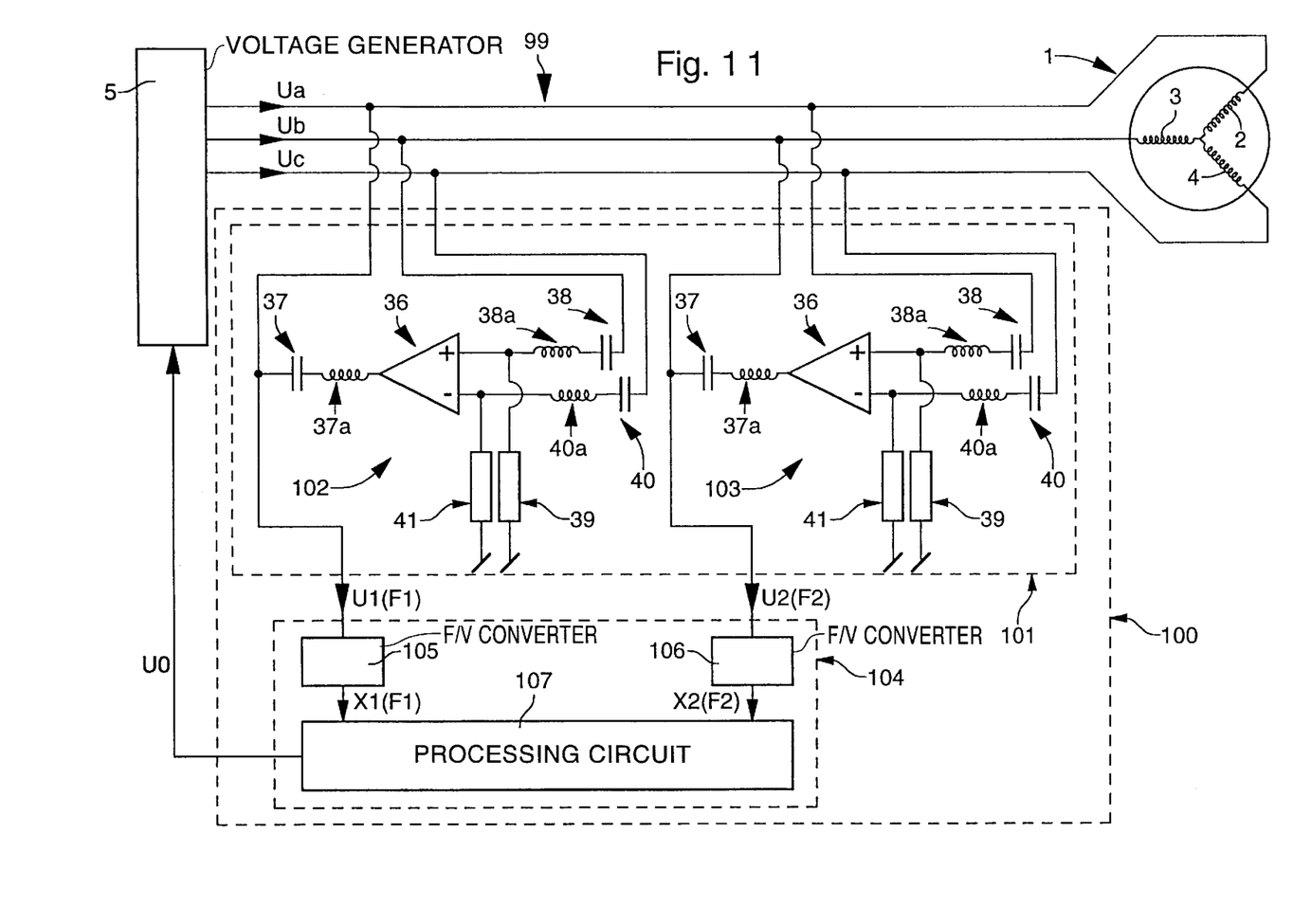
FIG. 11 shows a second embodiment of the device of FIG. 3.

Also by way of variant, the measuring means can be arranged to measure frequencies F1 and F2 simultaneously, unlike the measuring means of FIG. 4 in which these frequencies are measured sequentially during a measurement cycle as described above. FIG. 11 shows a second embodiment of the control device according to the present invention, designated by the reference 99, which includes detection means 100 provided with measuring means 101 as mentioned above, and calculating means 104. It will be noted in FIG. 11 that elements of control device 99 which are identical to those described in relation to the preceding Figures, have been designated by the same references. Measuring means 101 include two amplification circuits 102 and 103 identical to amplification circuit 35 of FIG. 4. Measuring means 104 include two frequency-voltage converters 105 and 106 identical to frequency-voltage converter 71 of FIG. 9, and a processing circuit 107 also similar to processing circuit 72 of FIG. 9. Essentially, it will be noted that amplification circuit 102 is connected to form configuration Y1 of FIG. 5, and that amplification circuit 103 is connected to form configuration Y2 of FIG. 6, so that signals U1 and U2 are provided simultaneously by calculating means 104.

Those skilled in the art will note that, in the event that frequencies F1 and F2 are simultaneously provided to the calculating means, each operational amplifier 36 of the two amplification circuits 102 and 103 cannot be connected to motor 1 via capacitors 37, 38 and 40, like the device of FIG. 4. Indeed, if this was the case, measurement signals U1 and U2 would be simultaneously present at the terminals of operational amplifiers 36 of the two circuits 102 and 103, which would mean that the two frequencies F1 and F2 could not be differentiated. For this purpose, three coils 37a, 38a and 40a are connected respectively in series with capacitors 37, 38 and 40, so as to form respectively three band pass filters tuned to a predetermined frequency, so that the filters of amplification circuit 102 are tuned to frequency F1 of signal U1 provided by circuit 102, and the filters of amplification circuit 103 are tuned to frequency F2 of signal U2 provided by circuit 103.

By way of improvement, the processing circuit can command, during a same measurement cycle, at least one additional configuration of the switching circuit, in order to provide a third frequency to increase the accuracy during detection of the rotor angular position, by said processing circuit.

Also by way of improvement, the processing circuit can also be programmed to be able to calculate, from successively determined angular position values, the number of revolutions made by the rotor, as well as the speed and acceleration of the rotor, and monitor the evolution of these different parameters over time.

Let us consider the calculation of the number of revolutions made by the rotor. Processing circuit 72, 107 can be programmed to store the angular position (or first value) determined at the end of a first measurement cycle, and the angular position (or second value) determined at the end of the following measurement cycle (or second cycle), and to calculate the difference between the second value and the first value, this difference providing the value of the movement made by the rotor during the second cycle, i.e. the desired number of revolutions.

Let us consider now the calculation of the rotational speed of the rotor. The processing circuit can be programmed to calculate the difference between two angular positions measured at the end of first and second consecutive measurement cycles, as is described hereinbefore, and to calculate the ratio of this difference over the period of a measurement cycle, this ratio providing the value of the speed of the rotor during said second cycle.

Likewise, in order to calculate the rotor acceleration, the processing circuit can be programmed to calculate the difference between two speeds of the rotor measured at the end of first and second consecutive measurement cycles, as is described above, and to calculate the ratio of this difference over a measurement cycle, this ration providing the acceleration value of the rotor during said second cycle.

Let us consider the monitoring of the different parameters. The processing circuit can be programmed to compare angular position $\theta$, the number of revolutions made, the speed or acceleration of the rotor at a predetermined comparison value.

By way of example, angular position $\theta$ can be compared to a theoretical value $\theta$s representing the ideal synchronism situation. It will be recalled in this regard that a transmission between the stator and rotor of an electric motor is called <<synchronous>> when the rotational speed of the rotor is equal to that of the rotating field. It will also be recalled that, during such a transmission, an increase in the resistant torque applied to the rotor causes an increase in the angular offset between the magnetic position of the rotor and that of the rotating field and that, beyond a certain value $\theta$d, the rotor is pulled out of synchronism.

Also by way of example, the comparison value of angular position $\theta$ can correspond to an angular position offset with respect to synchronism value $\theta$s, this angular offset being able to cause a sufficient motor torque for the rotor to drive a predetermined load.

Also by way of example, angular position $\theta$ can also be compared to the pulling out of synchronism value $\theta$d, so as to check whether this offset is less than pulling out of synchronism value θd, i.e. to check whether the motor has fallen out of synchronism.

What is claimed is:

1. A device for controlling an electric motor provided with a rotor fitted with a permanent magnet magnetically coupled to at least first, second and third stator coils connected to first, second and third connection terminals, said device including:

means for providing, via first, second and third output terminals, first, second and third respective control signals to said first, second and third connection terminals of said motor, respectively, said signals being periodic at a control frequency; and detecting means for detecting an angular position of the rotor; wherein said detecting means includes:

measuring means arranged to be able to be connected to said first, second and third connection terminals, said measuring means forming with said first, second and third stator coils at least first and second oscillating circuits having respectively first and second distinct electric configurations, so that the first and second oscillating circuits can provide respectively first and second periodic measurement signals having first and second frequencies, respectively, that are substantially higher than said control frequency and that vary periodically with the angular position of said rotor, at a period corresponding to a complete rotation of the rotor divided by the number of poles of said permanent magnet; and calculating means arranged to receive the first and second measurement signals, calculate said angular position from the couple formed by the first and second frequencies of said signals and to provide a value of said angular position.

2. A control device according to claim 1, wherein said first and second measurement signals have amplitudes substantially lower than those of said control signals.

3. A control device according to claim 1, further including at least first, second and third filtering means connected between, on the one hand, said first, second and third output terminals, respectively, and on the other hand said first, second and third connection terminals, respectively, so that the first and second measurement signals do not disturb the normal operation of the motor.

4. A control device according to claim 3, wherein each of said filtering means includes a band-stop filter.

5. A control device according to claim 3, wherein each of said filtering means includes a low-pass filter.

6. A control device according to claim 1, wherein said measuring means includes:

a switching circuit arranged to receive a control signal and to form sequentially, in response to said signal, the connections of the measuring means to said connection terminals in accordance with said first and second electric configurations; and an amplification circuit arranged to provide said first and second measurement signals at said first and second respective frequencies, when said switching circuit forms said first and second electric configurations, respectively.

7. A device for controlling an electric motor provided with a rotor fitted with a permanent magnet magnetically coupled to at least first, second and third stator coils connected to first, second and third connection terminals, said device including:

means for providing, via first, second and third output terminals, first, second and third respective control signals to said first, second and third connection terminals of said motor, respectively, said signals being periodic at a control frequency; and detecting means for detecting an angular position of the rotor; wherein said detecting means includes:

measuring means arranged to be able to be connected to said first, second and third connection terminals, said measuring means forming with said first, second and third stator coils at least first and second oscillating circuits having respectively first and second distinct electric configurations, so that the first and second oscillating circuits can provide respectively first and second periodic measurement signals at first and second respective frequencies which are themselves periodic functions of the angular position of said rotor, at a period corresponding to a complete rotation of the rotor divided by the number of poles of said permanent magnet; and calculating means arranged to receive the first and second measurement signals, calculate said angular position from the couple formed by the first and second frequencies of said signals and to provide a value of said angular position, wherein said measuring means includes:

a switching circuit arranged to receive a control signal and to form sequentially, in response to said signal, the connections of the measuring means to said connection terminals in accordance with said first and second electric configurations; and an amplification circuit arranged to provide said first and second measurement signals at said first and second respective frequencies, when said switching circuit forms said first and second electric configurations, respectively; and wherein said amplification circuit includes an operational amplifier whose output terminal is intended to be connected via a first capacitor to one of said first, second and third connection terminals and to the calculating means, a non-inverting input of said amplifier being intended to be connected via a second capacitor to one of the two remaining connection terminals, and wherein an inverting terminal of said operational amplifier is intended to be connected, via a third capacitor, to the other of said remaining connection terminals.

8. A control device according to claim 7, wherein said switching circuit forms said first configuration so that the output terminal of said operational amplifier is connected to said first connected terminal via said first capacitor, wherein the non-inverting input terminal of said amplifier is connected to said second connection terminal via said second capacitor and wherein the inverting input terminal of said amplifier is connected to said third connection terminal via said third capacitor.

9. A control device according to claim 7, wherein said switching circuit forms said second configuration so that the output terminal of said operational amplifier is connected to said second connection terminal via said first capacitor, wherein the non-inverting input terminal of said amplifier is connected to said first connection terminal via said second capacitor, and wherein the inverting input terminal of said amplifier is connected to said third connection terminal via said third capacitor.

10. A control device according to claim 7, wherein said calculating means includes:

a frequency-voltage converter arranged to receive said first and second measurement signals, to convert these signals into first and second electric voltages which represent respectively said first and second frequencies, and to provide said voltages; and a processing circuit arranged to: receive said first and second electric voltages; to carry out operations allowing a single value corresponding to the couple formed by said first and second frequencies contained respectively in said first and second electric voltages to be determined; and to supply said single value as being said value of the angular position.

11. A control device according to claim 10, wherein said processing circuit is arranged to supply said control signal to said switching circuit, so as to define a measurement cycle during a first phase of which said measuring means has said first configuration and a second phase of which said measuring means has said second configuration.

12. A device for controlling an electric motor provided with a rotor fitted with a permanent magnet magnetically coupled to at least first, second and third stator coils connected to first, second and third connection terminals, said device including:

means for providing, via first, second and third output terminals, first, second and third respective control signals to said first, second and third connection terminals of said motor, respectively, said signals being periodic at a control frequency; and detecting means for detecting an angular position of the rotor; wherein said detecting means includes:

measuring means arranged to be able to be connected to said first, second and third connection terminals, said measuring means forming with said first, second and third stator coils at least first and second oscillating circuits having respectively first and second distinct electric configurations, so that the first and second oscillating circuits can provide respectively first and second periodic measurement signals at first and second respective frequencies which are themselves periodic functions of the angular position of said rotor, at a period corresponding to a complete rotation of the rotor divided by the number of poles of said permanent magnet; and calculating means arranged to receive the first and second measurement signals, calculate said angular position from the couple formed by the first and second frequencies of said signals and to provide a value of said angular position;

wherein said measuring means includes:

a first amplification circuit including an operational amplifier whose output terminal is connected, via a first capacitor and a first coil connected in parallel with said first capacitor, to said first connection terminal and to the calculating means, a non-inverting input terminal of said amplifier being connected, via a second capacitor and a second coil connected in parallel with said second capacitor, to said second connection terminal, and wherein an inverting terminal of said operational amplifier is connected, via a third capacitor and a third coil connected in parallel with said third capacitor, to said third connection terminal; and a second amplification circuit including an operational amplifier whose output terminal is connected, via a first capacitor and a first coil connected in parallel with said first capacitor, to said second connection terminal and to the calculating means, a non-inverting input terminal of said amplifier being connected, via a second capacitor and a second coil connected in parallel with said second capacitor, to said first connection terminal, and wherein an inverting terminal of said operational amplifier is connected, via a third capacitor and a third coil connected in parallel with said third capacitor, to said third connection terminal.

13. A control device according to claim 12, wherein said calculating means includes:

a first frequency-voltage converter arranged to receive said first measurement signal, to convert said signal into a first electric voltage representative of said first frequency and to supply said voltage;

a second frequency-voltage converter arranged to receive said second measurement signal, to convert said signal into a second electric voltage representative of said second frequency and to supply said voltage; and a processing circuit arranged to: receive from said first and second frequency-voltage converters said first and second electric voltages respectively; to carry out operations allowing a single value corresponding to the couple formed by said first and second frequencies contained respectively in said first and second electric voltages to be determined; and to supply said single value as being said value of the angular position.

14. A control device according to claim 12, wherein said processing circuit is programmed to contain a correspondence table between a first plurality of frequency values and a second plurality of angular position values, said first and second pluralities being linked to each other in accordance with one of said periodic functions to said period corresponding to a complete rotation of the rotor divided by the number of poles of said permanent magnet.

15. A control device according to claim 14, wherein said operations of said processing circuit comprise, during a measurement cycle: determining, from said correspondence table, first and second angular position values corresponding to said first frequency contained in said first electric voltage, and third and fourth angular position values corresponding to said second frequency contained in said second electric voltage; determining the single couple formed by one of said first and second values and one of said third and fourth values, so that the difference between these two values is equal to an angular offset between two consecutive stator coils of said motor; and supplying that of said first and second values of said single couple, as being said single value.

16. A control device according to claim 15, wherein said processing circuit is programmed to compare said angular position obtained at the end of said operations to a predetermined comparison value, so as to monitor the evolution of said rotor angular position over time.

17. A control device according to claim 16, wherein said comparison value is equal to a value representing an ideal synchronism situation.

18. A control device according to claim 16, wherein said comparison value is equal to a value able to cause a sufficient motor torque to drive a load applied to the rotor.

19. A control device according to claim 16, wherein said comparison value is a value representing the pulling out of synchronism of the motor.

20. A control device according to claim 15, wherein said processing circuit is programmed to: store as first position a reference angular position or the angular position calculated at the end of a first measurement cycle, and as second position the angular position calculated at the end of the following or second measurement cycle; to calculate the difference between said second position and said first position, said difference representing the angular displacement value of the rotor during said second cycle, and to compare said angular displacement to a predetermined comparison value; so as to monitor the evolution of the number of revolutions made by said rotor over time.

21. A control device according to claim 15, wherein said processing circuit is programmed to: store as first position a reference angular position or the angular position calculated at the end of a first measurement cycle, and as second position the angular position calculated at the end of the following or second measurement cycle; to calculate the ratio of said difference between said second position and the first position over the measurement cycle period, said ratio representing a value of the rotational speed of the rotor during said second cycle, and to compare said rotational speed to a predetermined comparison value; so as to monitor the evolution of the rotational speed of said rotor over time.

22. A control device according to claim 21, wherein said processing circuit is programmed to: store as first speed the rotational speed of the rotor calculated at the end of said second measurement cycle, and as second speed the speed calculated at the end of the following measurement cycle or third cycle; calculate the ratio of the difference between said second speed and said first speed over a measurement cycle period, said ratio representing an acceleration value of the rotor during said third cycle; and compare said acceleration value to a predetermined comparison value, so as to monitor the evolution of said rotor's acceleration over time.

23. A control device according to claim 10, wherein each frequency-voltage converter includes a frequency discriminator.

24. A control device according to claim 10, wherein said processing circuit includes a 32 bit microprocessor.

25. A control device according to claim 13, wherein each frequency-voltage converter includes a frequency discriminator.

26. A control device according to claim 13, wherein said processing circuit includes a 32 bit microprocessor.

27. A control device according to claim 10, wherein said processing circuit is programmed to contain a correspondence table between a first plurality of frequency values and a second plurality of angular position values, said first and second pluralities being linked to each other in accordance with one of said periodic functions to said period corresponding to a complete rotation of the rotor divided by the number of poles of said permanent magnet.

28. A control device according to claim 27, wherein said operations of said processing circuit consist, during a measurement cycle: determining, from said correspondence table, first and second angular position values corresponding to said first frequency contained in said first electric voltage, and third and fourth angular position values corresponding to said second frequency contained in said second electric voltage; determining the single couple formed by one of said first and second values and one of said third and fourth values, so that the difference between these two values is equal to an angular offset between two consecutive stator coils of said motor; and supplying that of said first and second values of said single couple, as being said single value.

* * * * *